US012612015B2

(12) United States Patent
Wu et al.

(10) Patent No.: US 12,612,015 B2
(45) Date of Patent: Apr. 28, 2026

(54) ABRASIVE BLOCK MOUNTING AND DISMOUNTING ASSEMBLY, MOUNTING AND DISMOUNTING METHOD, WHEEL TREAD CLEANER AND RAILWAY VEHICLE

(71) Applicants: CRRC CHANGZHOU TECH-MARK INDUSTRIAL CO., LTD., Jiangsu (CN); CRRC QISHUYAN INSTITUTE CO., LTD., Jiangsu (CN)

(72) Inventors: Anxu Wu, Jiangsu (CN); Bo Wu, Jiangsu (CN); Yuchen Zhang, Jiangsu (CN); Hao Xu, Jiangsu (CN); Chang Feng, Jiangsu (CN); Zichen Wang, Jiangsu (CN); Dongdong Wang, Jiangsu (CN); Xun Chen, Jiangsu (CN)

(73) Assignees: CRRC CHANGZHOU TECH-MARK INDUSTRIAL CO., LTD., Jiangsu (CN); CRRC QISHUYAN INSTITUTE CO., LTD., Jiangsu (CN)

( * ) Notice: Subject to any disclaimer, the term of this patent is extended or adjusted under 35 U.S.C. 154(b) by 983 days.

(21) Appl. No.: 17/767,775

(22) PCT Filed: Oct. 9, 2020

(86) PCT No.: PCT/CN2020/120007
§ 371 (c)(1),
(2) Date: Apr. 8, 2022

(87) PCT Pub. No.: WO2021/068892
PCT Pub. Date: Apr. 15, 2021

(65) Prior Publication Data
US 2023/0339436 A1 Oct. 26, 2023

(30) Foreign Application Priority Data

Oct. 10, 2019 (CN) .......................... 201910957986.4
Oct. 23, 2019 (CN) .......................... 201911011070.6
(Continued)

(51) Int. Cl.
*B60S 1/68* (2006.01)

(52) U.S. Cl.
CPC ...................................... *B60S 1/68* (2013.01)

(58) Field of Classification Search
CPC ........... B60S 1/68; F01D 25/285; B61H 1/00
See application file for complete search history.

(56) References Cited

U.S. PATENT DOCUMENTS 2,768,713 A * 10/1956 Tack ...................... F16D 65/062
                                                      188/205 R
2,940,553 A * 6/1960 Newell .............. B61H 15/0021
                                                      188/153 R
(Continued)

FOREIGN PATENT DOCUMENTS

CN        2516744 Y       10/2002
CN        201183495 Y *   1/2009
(Continued)

OTHER PUBLICATIONS

CNIPA First Office Action for corresponding CN Application No. 201911011070.6; Issued on Jun. 8, 2024.
(Continued)

*Primary Examiner* — Jason C Smith
(74) *Attorney, Agent, or Firm* — CANTOR COLBURN LLP

(57) ABSTRACT

An abrasive block mounting and dismounting assembly, a mounting and dismounting method, a wheel tread cleaning device, and a railway vehicle.

20 Claims, 5 Drawing Sheets

(30) Foreign Application Priority Data

| | | |
|---|---|---|
| Oct. 23, 2019 | (CN) | 201921785735.4 |
| Nov. 4, 2019 | (CN) | 201911066942.9 |

(56) References Cited

U.S. PATENT DOCUMENTS

| | | | | | |
|---|---|---|---|---|---|
| 3,205,980 | A | * | 9/1965 | Kettering | B61H 1/003 |
| | | | | | 188/217 |
| 3,253,682 | A | * | 5/1966 | Haydn | B61H 1/00 |
| | | | | | 188/196 P |
| 4,276,968 | A | * | 7/1981 | Cripe | B60T 17/08 |
| | | | | | 188/74 |
| 2004/0124041 | A1 | * | 7/2004 | Korleski | F16D 65/42 |
| | | | | | 188/196 R |
| 2016/0207549 | A1 | * | 7/2016 | Jackson | F16D 66/02 |
| 2017/0095389 | A1 | * | 4/2017 | Perkins | F16B 21/12 |
| 2023/0339436 | A1 | * | 10/2023 | Wu | F16D 65/06 |

FOREIGN PATENT DOCUMENTS

| | | | | |
|---|---|---|---|---|
| CN | 201714879 | U | 1/2011 | |
| CN | 202883661 | U | 4/2013 | |
| CN | 104747561 | A | * 7/2015 | F16B 19/02 |
| CN | 106638188 | A | 5/2017 | |
| CN | 206383970 | U | 8/2017 | |
| CN | 206456337 | U | 9/2017 | |
| CN | 109017692 | A | 12/2018 | |
| CN | 211308545 | U | 8/2020 | |
| JP | 2016147592 | A | * 8/2016 | |
| JP | 2018103872 | A | * 7/2018 | |

OTHER PUBLICATIONS

CNIPA Office Action for corresponding CN Application No. 201910957986.4; Issued on Jan. 10, 2022.

CNIPA Office Action for corresponding CN Application No. 201911066942.9; Issued on Mar. 4, 2022.

International Search Report for International Application No., PCT/CN2020/120007; Date of Mailing, Jan. 7, 2021.

CNIPA Second Office Action for corresponding CN Application No. 201911011070.6; Issued Dec. 5, 2024.

\* cited by examiner

ABRASIVE BLOCK MOUNTING AND DISMOUNTING ASSEMBLY, MOUNTING AND DISMOUNTING METHOD, WHEEL TREAD CLEANER AND RAILWAY VEHICLE

CROSS REFERENCE TO RELATED APPLICATIONS

This is the U.S. national stage of application No. PCT/CN2020/120007, filed on Oct. 9, 2020. Priority under 35 U.S.C. § 119(a) and 35 U.S.C. § 365(b) is claimed from Chinese Application Nos., CN201910957986.4, filed Oct. 10, 2019; CN201911011070.6, filed Oct. 23, 2019; CN201921785735.4 filed Oct. 23, 2019; and CN201911066942.9 filed Nov. 4, 2019, the disclosures of which are all also incorporated herein by reference.

FIELD OF THE INVENTION

The present application relates to the field of railway vehicle equipment, and in particular, to an abrasive block mounting and dismounting assembly, a mounting and dismounting method, a wheel tread cleaner, and a railway vehicle.

BACKGROUND OF THE INVENTION

As one of the standard configurations of railway vehicle disc brake systems, the wheel tread cleaner can effectively deal with the phenomena of wheel tread damage, out-of-roundness and low adhesion. Specifically, the abrasive block of tread cleaner has functions such as tread cleaning, wheel-rail adhesion improving, and wheel shape trimming, which can effectively prevent the wheels from slipping and idling and can effectively improve the braking performance and comfort of the train. This has been verified in actual use.

Considering the work done by the abrasive block, some railway vehicles have strict requirements on the reliability of abrasive block mounting. At present, as one of the common abrasive block mounting structures, the torsion spring support arms lock the mounting hook in the rectangular cavity of the brake head, and the mounting position of the abrasive block is restricted by the protruding portion of the mounting hook. This structure has the advantage of promoting the efficient mounting of the abrasive block and the brake head but has low efficiency of dismounting them. In addition, the strength of this mounting structure cannot meet the working requirements of the abrasive block, since its ability to withstand vehicle harmful vibrations and accidental impacts is not so good.

In addition, when the train is running, due to the track and other reasons, the wheels will vibrate up and down, so the brake head of the tread cleaner must achieve the function of swinging up and down. In the past, the joint between the brake head and the piston rod of the tread cleaner are connected by hinged bolts, which can achieve this function well, but one end of the bolt needs to be fixed during mounting to complete the assembly.

Furthermore, the existing abrasive blocks themselves still have some deficiencies in aspects such as structural configuration, use effect, safety performance, manufacture and maintenance costs, etc., which can be further improved and optimized. For example, the abrasive blocks currently configured on high-speed trains are in direct contact with the wheel tread during use. Due to the high speed of the wheels and the large friction area between the abrasive blocks and the wheels, a large amount of heat and abrasive debris will be generated during the friction process. And the temperature of the friction surface of the abrasive block will become very high, which will reduce the surface hardness, so that the abrasive block and the wheel tread are directly and closely attached to each other, and the abrasive debris will adhere to the surface of the wheel and will not be easily evacuated. As the metal debris accumulates, this long-term accumulation can easily lead to the formation of metal inlays, which may scratch the wheel tread in more severe cases and bring operational risks.

SUMMARY OF THE INVENTION

In view of above, the present application provides an abrasive block mounting and dismounting assembly, a mounting and dismounting method, a wheel tread cleaner, and a railway vehicle, thereby effectively solving or at least alleviating one or more of the above problems and problems in other aspects in the prior art.

According to one aspect of the present application, an abrasive block mounting and dismounting assembly is provided, which comprises: a mounting pin comprising a base portion and a pin portion extending and protruding from the base portion, the size of the pin portion in the extending direction thereof being smaller than the size of the base portion; wherein the pin portion is used to pass from a first side to a second side of a mounting cavity of a brake head, and the base portion is used to abut against the first side of the mounting cavity of the brake head; a mounting pin receiving portion having a first mounting hole for receiving the pin portion to be inserted therein, and the mounting pin receiving portion is used to receive the pin portion on the second side of the mounting cavity of the brake head; and a mounting pin locking member for detachably locking the pin portion of the mounting pin with the mounting pin receiving portion, and restricting movement of the pin portion in the extending direction thereof.

Optionally, in an embodiment of the abrasive block mounting and dismounting assembly, the mounting pin receiving portion comprises: a limiting member for restricting an abrasive block mounted on the brake head from moving in a direction away from the brake head; and a stopper; wherein the first mounting hole has a first section extending through the limiting member, and a second section extending at least partially into the stopper; and the mounting pin locking member detachably locks the pin portion of the mounting pin with the stopper, and restricts movement of the pin portion and the limiting member in the extending direction thereof.

Optionally, in an embodiment of the abrasive block mounting and dismounting assembly, a side edge of the pin portion is provided with a first notch and a second notch arranged in a stepped shape in the extending direction thereof, the size of the first notch being larger than the size of the second notch in the extending direction of the pin portion; wherein, the first notch is matched with the first section of the first mounting hole, and the second notch is matched with the second section of the first mounting hole.

Optionally, in an embodiment of the abrasive block mounting and dismounting assembly, the mounting pin locking member comprises a positioning pin, and the mounting pin receiving portion is provided with a first positioning hole in communication with the first mounting hole; the pin portion is provided with a second positioning hole; wherein, the extending direction of the first positioning hole and the second positioning hole is arranged crosswise to the extending direction of the pin portion; the positioning pin is inserted through the first positioning hole and the second positioning hole to lock the mounting pin receiving portion and the pin portion.

Optionally, in an embodiment of the abrasive block mounting and dismounting assembly, the second positioning hole is a closed hole or a notch provided along a side edge of the pin portion.

Optionally, in an embodiment of the abrasive block mounting and dismounting assembly, the positioning pin is a cotter pin with a bent portion at least at one end. When the cotter pin is inserted through the first positioning hole and the second positioning hole, the bent portion is bent to restrict the movement of the cotter pin in the insertion direction.

According to another aspect of the present application, a wheel tread cleaner is further provided, which comprises: a brake head, an abrasive block, and the aforementioned abrasive block mounting and dismounting assembly; wherein, the brake head has an extending and protruding mounting joint having a mounting cavity; the abrasive block is sleeved on the brake head from a side of the brake head with the mounting joint, with the mounting cavity exposed; and the abrasive block mounting and dismounting assembly restricts movement of the abrasive block in a direction away from the brake head via the mounting pins mounted on both sides of the mounting cavity and the mounting pin receiving portion, and detachably locks the pin portion of the mounting pin with the mounting pin receiving portion via the mounting pin locking member.

Optionally, in an embodiment of the wheel tread cleaner, it further comprises: the base portion of the mounting pin and the mounting pin receiving portion of the abrasive block mounting and dismounting assembly are configured to abut against the abrasive block and restrict the abrasive block from moving in a direction away from the brake head.

Optionally, in an embodiment of the wheel tread cleaner, it further comprises: a split-type abrasive block, comprising: a connecting piece detachably mounted on a brake head of a railway vehicle; and at least two abrasive block assemblies, wherein each abrasive block assembly has a friction piece and a support piece, the friction piece is configured to provide a surface for frictional contact with a wheel tread of a railway vehicle, and is connected with the connecting piece through the support piece, and a gap is provided between the at least two abrasive block assemblies.

Optionally, in an embodiment of the wheel tread cleaner, an elastic member is provided between the support piece of at least one of the abrasive block assemblies and the connecting piece.

Optionally, in an embodiment of the wheel tread cleaner, the elastic member comprises a disc spring, and the connecting piece is provided with a hole groove for accommodating the elastic member.

Optionally, in an embodiment of the wheel tread cleaner, the split-type abrasive block comprises three abrasive block assemblies, which are arranged so that the widths of the gaps between two adjacent abrasive block assemblies are equal, and an overall surface formed by the surfaces of the friction pieces in the respective abrasive block assemblies is in the shape of a circular arc.

Optionally, in an embodiment of the wheel tread cleaner, the support piece is configured to have a cylindrical boss that passes through a mounting hole provided on the connecting piece and is clamped on the connecting piece through a gasket.

Optionally, in an embodiment of the wheel tread cleaner, the connecting piece is mounted on the brake head through a concave-convex structure.

Optionally, in an embodiment of the wheel tread cleaner, the friction piece and the support piece are integrally hot-pressed and are sintered and cured.

Optionally, in an embodiment of the wheel tread cleaner, the friction pieces adopt a shape-trimming friction piece and/or an adhesion-improving friction piece, and/or the friction pieces in the respective abrasive block assemblies are respectively made of the same or different materials, and/or the support pieces in the respective abrasive block assemblies are respectively made of the same or different materials, and/or the widths of the respective gaps in the abrasive block assemblies are equal or not equal to each other.

Optionally, in an embodiment of the wheel tread cleaner, it further comprises: a cylinder member comprising a piston rod capable of performing linear movement; wherein the brake head is connected to the piston rod and the brake head is provided with the abrasive block; a coupling end of the piston rod has two bolt holes, a coupling portion of the brake head has a first clamping piece and a second clamping piece, the first clamping piece and the second clamping piece respectively have bolt holes, the positions of which correspond to that of the bolt holes of the piston rod, and the first clamping piece and the second clamping piece are located on both sides of the coupling end of the piston rod. A first bolt and a second bolt respectively pass through the bolt holes of the first clamping piece, the coupling end of the piston rod and the second clamping piece, and are received by nuts on the outer side of the second clamping piece, wherein one or more limiting components against which the bolt heads of the first bolt and the second bolt abut are provided on the outer side of the first clamping piece to restrict rotation of the first bolt and the second bolt.

Optionally, in an embodiment of the wheel tread cleaner, the bolt head is an outer hexagonal, and the limiting component abuts against one or two surfaces of the bolt head.

Optionally, in an embodiment of the wheel tread cleaner, the limiting component is formed as a boss located on the outer side of the first clamping piece.

Optionally, in an embodiment of the wheel tread cleaner, the boss has a flat end face that abuts against one surface of the bolt heads of the first bolt and the second bolt at the same time.

Optionally, in an embodiment of the wheel tread cleaner, the boss comprises a first boss corresponding to the first bolt and a second boss corresponding to the second bolt.

Optionally, in an embodiment of the wheel tread cleaner, the first boss and the second boss respectively comprise a first corner cut and a second corner cut that abut against two adjacent surfaces of the bolt heads of the first bolt and the second bolt, respectively.

Optionally, in an embodiment of the wheel tread cleaner, the limiting component is formed as a groove recessed from the outer side of the first clamping piece, and the bolt heads of the first bolt and the second bolt are arranged in the groove and abut against the side walls of the groove.

Optionally, in an embodiment of the wheel tread cleaner, a first elastic component and a second elastic component are respectively provided between the inner sides of the first clamping piece and the second clamping piece and the coupling end of the piston rod, and the first bolt and the second bolt also pass through the first elastic component and the second elastic component, respectively.

Optionally, in an embodiment of the wheel tread cleaner, the two bolt holes are arranged in a transverse direction perpendicular to the moving direction of the piston rod, and the first bolt and the second bolt pass through the two bolt holes in a longitudinal direction.

Optionally, in an embodiment of the wheel tread cleaner, it further comprises: a cylinder member comprising a piston rod capable of performing linear movement; wherein the brake head is connected to the piston rod and the brake head is provided with an abrasive block; a coupling portion of the brake head has two bolt holes, a coupling end of the piston rod has a first clamping piece and a second clamping piece that respectively have bolt holes, the positions of which correspond to that of the bolt holes of the brake head, and the first clamping piece and the second clamping piece are located on both sides of the coupling portion of the brake head. A first bolt and a second bolt respectively pass through the bolt holes of the first clamping piece, the coupling portion of the brake head and the second clamping piece, and are received by nuts on the outer side of the second clamping piece, wherein a limiting component against which the bolt heads of the first bolt and the second bolt abut is provided on the outer side of the first clamping piece to restrict the rotation of the first bolt and the second bolt.

According to yet another aspect of the present application, a railway vehicle is further provided, which comprises: the aforementioned abrasive block mounting and dismounting assembly, or the aforementioned wheel tread cleaner.

According to a further aspect of the present application, a method for mounting and dismounting an abrasive block and a brake head is further provided, wherein the brake head has an extending and protruding mounting joint having a mounting cavity. The method comprises: mounting steps: sleeving the abrasive block on the brake head from a side of the brake head with the mounting joint, with the mounting cavity exposed; inserting the pin portion of the mounting pin of the aforementioned abrasive block mounting and dismounting assembly from a first side through into a second side of the mounting cavity, until the base portion of the mounting pin abuts against the first side of the mounting cavity; receiving, using the first mounting hole of the mounting pin receiving portion, the pin portion protruding from the second side of the mounting cavity; and locking, using the mounting pin locking member, the pin portion of the mounting pin with the mounting pin receiving portion; and/or dismounting steps: unlocking the mounting pin locking member of the aforementioned abrasive block mounting and dismounting assembly, and removing it from the pin portion of the mounting pin and the mounting pin receiving portion; removing the pin portion until it leaves the first mounting hole of the mounting pin receiving portion and the mounting cavity; and removing the abrasive block sleeved on the brake head from the side of the brake head with the mounting joint.

The principles, characteristics, features and advantages, etc. of the various technical solutions according to the present application will be clearly understood from the following detailed description in conjunction with the accompanying drawings. For example, compared with the prior art, the technical solutions of the present application achieve quick mounting and dismounting through a simple structure, and have high locking reliability and high structural strength, effectively preventing the wear of the abrasive block mounting and dismounting assembly of the wheel tread cleaner caused by abnormal impacts to the components due to harmful vibrations of vehicles, and ensuring the safe and reliable operation of the wheel tread cleaner for rail transit vehicles, and effectively improving the problem of wheel-rail adhesion.

In addition, regarding the technical solution of the split-type abrasive block in the wheel tread cleaner of the present application, compared with the prior art, the present technical solution is easier for manufacture, mounting, assembling and maintenance. In addition, by arranging gaps, which are used for debris removal, heat dissipation, etc., between the friction pieces of the split-type abrasive block, the temperature of the friction surface of the abrasive block can be effectively reduced during use, and the probability of scratching the wheels due to the formation of metal inlays in the abrasive block can be reduced, thereby effectively improving the efficiency, safety and reliability of the entire system. Moreover, the friction pieces can arbitrarily use shape-trimming friction pieces and adhesion-improving friction pieces alone or in combination, such that the overall performance of the split-type abrasive block can be made to be better and more flexible in use. In addition, by arranging structural configurations such as gaskets, disc springs, and dovetail grooves in the split-type abrasive block, the influence from frictional vibration, impact and noise can be effectively reduced, and the system structure can be made more stable and reliable. The present invention has very remarkable practicability and good application prospect.

BRIEF DESCRIPTION OF THE DRAWINGS

The technical solutions of the present invention will be described in further detail below in conjunction with the accompanying drawings and embodiments. However, it should be understood that these drawings are designed merely for the purpose of explanation and only intended to conceptually illustrate the structural configurations described herein and are not required to be drawn to scale.

DETAILED DESCRIPTION OF EMBODIMENT(S) OF THE INVENTION

Figure 1:
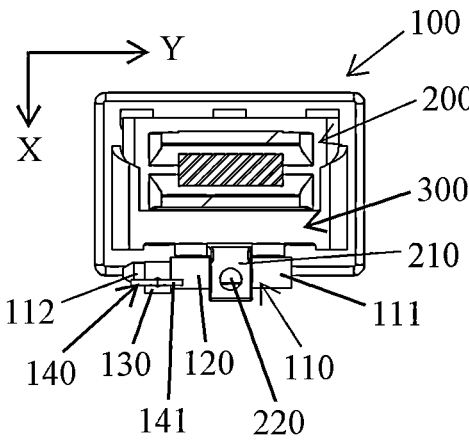
FIG. 1 is a schematic diagram of an embodiment of an assembled abrasive block mounting and dismounting assembly, an abrasive block and a brake head of the present application.

First, it should be noted that the components, working principles, characteristics, advantages and the like of the abrasive block mounting and dismounting assembly, the mounting and dismounting method, the wheel tread cleaner and the railway vehicle according to the present invention will be described below by way of example. However, it should be understood that all descriptions are given for the purpose of illustration only and should not be construed to constitute any limitation of the present invention. As used herein, the technical term "connect" and its derivatives encompass the direct connection of one component to another component and/or the indirect connection of one component to another component.

In addition, for any single technical feature described or implied in the embodiments mentioned herein or any single technical feature shown or implied in individual drawings, the present invention still allows for any combination or deletion of these technical features (or equivalents thereof) without any technical obstacle, thereby obtaining more other embodiments of the present application that may not be directly mentioned herein.

Furthermore, the orientation terms such as upper, lower, left, right, front, rear, front side, back side, top, bottom, etc. mentioned or possibly mentioned in this specification are defined with respect to the structures shown in the drawings. They are relative concepts, so they may change accordingly in accordance to their different locations and different usage states. Therefore, these or other orientation terms should not be construed as restrictive terms.

FIG. 1 only schematically shows the general structural configurations of an embodiment of an assembled abrasive block mounting and dismounting assembly, an abrasive block and a brake head according to the present application. FIG. 2 to FIG. 5 respectively show part of the components therein, such as the brake head, the mounting pin, the limiting member and the stopper, etc. The technical solutions of the present invention will be described in detail below with reference to the above drawings.

As shown in FIG. 1, the abrasive block mounting and dismounting assembly 100 has completed the locking of the abrasive block 300 sleeved on the brake head 200. The abrasive block mounting and dismounting assembly 100 comprises a mounting pin 110, a mounting pin receiving portion, and a mounting pin locking member.

Wherein, the mounting pin 110 comprises a base portion 111 and a pin portion 112 extending and protruding from the base portion 111 in the negative direction of the Y-axis in the figure. To ensure that the mounting pin is inserted into and passed through the mounting cavity 220 of the brake head 200 and stays at a predetermined position, the size of the pin portion 112 in its extending direction (i.e., the negative direction of the Y-axis) may be set to be smaller than the size of the base portion 111. Of course, at the same time, the size of the pin portion 112 should not be larger than the size of the mounting cavity 220 in the negative direction of the Y-axis, and the size of the base portion 111 should be correspondingly larger than the size of the mounting cavity 220 in the negative direction of the Y-axis. It should be understood that the "size" mentioned here refers to the relationship between the cross-sectional area and the maximum length on the cross-section of several components that are in mutually insertion or abutting relationship with each other. That is, when the size of the pin portion 112 in its extending direction is smaller than the size of the base portion 111, the pin portion 112 should be smaller than the base portion 111 in both the cross-sectional area and the maximum length of the cross-section; and when the size of the pin portion 112 is not larger than the size of the mounting cavity 220 in the negative direction of the Y-axis, the pin portion 112 should not be larger than the mounting cavity 220 in both the cross-sectional area and the maximum length of the cross-section. It is not described one by one here. In this way, the pin portion 112 of the mounting pin 110 can pass from the first side (the positive side of the Y-axis in the figure) to the second side (the negative side of the Y-axis in the figure) of the mounting cavity 220 of the brake head 200, and the base portion 111 can then abut against the first side (the positive side of the Y-axis in the figure) of the mounting cavity 220 of the brake head 200.

In addition, the limiting member 120 and the stopper 130 shown in FIG. 1 together function as a mounting pin receiving portion having a first mounting hole for receiving the pin portion 112 to be inserted therein. In the figure, the mounting pin receiving portion is used to receive the pin portion 112 into the first mounting hole on the second side (the negative side of the Y-axis in the figure) of the mounting cavity 220 of the brake head 200, and a mounting pin locking member of a cotter pin 140 shown in the figure is used to detachably lock the pin portion 112 of the mounting pin 110 with the mounting pin receiving portion, and restrict the movement of the pin portion 112 in its extending direction (the negative side of the Y-axis in the figure).

Under such an arrangement, the aforementioned embodiment of the present application provides an abrasive block mounting and dismounting assembly capable of realizing efficient mounting, having high structural strength, and capable of efficiently dismounting and replacing the abrasive block after it is worn out, thereby ensuring safe and reliable operation of the wheel tread cleaner of the rail transit vehicle with abrasive blocks in normal state, and effectively improving the problem of wheel-rail adhesion.

Referring again to FIGS. 1, FIG. 4, and FIG. 5, as an example of a specific structural form of the mounting pin receiving portion, it may comprise a limiting member 120 and a stopper 130. The split-type structure has the advantage of being simpler to process, while the components thereof still being able to perform their own functions. Specifically, the first mounting hole of the mounting pin receiving portion has a first section 121 extending through the limiting member 120, so that the pin portion 112 can extend through the limiting member 120 during assembly. And, after the assembly is completed, the limiting member 120 can restrict the movement of the abrasive block 300 mounted on the brake head 200 in a direction away from the brake head 200 (the positive direction of the X-axis in the figure) by abutting or other means. Furthermore, the first mounting hole of the mounting pin receiving portion has a second section 131 extending at least partially into the stopper 130, so that the pin portion 112 can be inserted at least partially into the stopper 130 during assembly. The locking of the stopper 130 and the pin portion 112 is then achieved via the mounting pin locking member, so as to restrict the pin portion 112 located between the stopper 130 and the base portion 111 of the mounting pin 110 and the limiting member 120 to move in both directions of the Y-axis. This arrangement achieves a highly reliable locking, avoiding undesired displacement of the abrasive block due to impact or other reasons.

It should be understood that the foregoing examples are merely illustrative and non-limiting, and modifications may be made as desired without departing from the scope of the concept of the present application. For example, as shown in FIG. 1, the second section 131 of the first mounting hole may also be a through hole that completely extends through the stopper 130, and in this case, the pin portion 112 of the mounting pin 110 may also extend therethrough and achieve its positioning and locking functions. Thus, it also falls within the scope of the concept of the present application.

Figure 3:
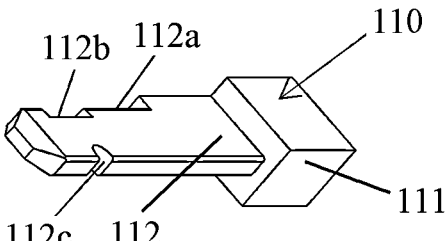
FIG. 3 is a schematic diagram of an embodiment of a mounting pin of an abrasive block mounting and dismounting assembly of the present application.
Figure 4:
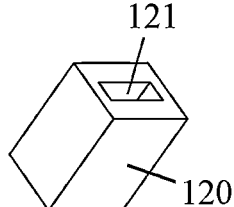
FIG. 4 is a schematic diagram of an embodiment of a limiting member of a mounting pin receiving portion of an abrasive block mounting and dismounting assembly of the present application.
Figure 5:
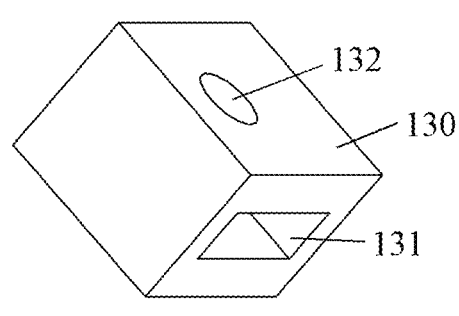
FIG. 5 is a schematic diagram of an embodiment of a stopper of a mounting pin receiving portion of an abrasive block mounting and dismounting assembly of the present application.

Turning to FIG. 1 and FIG. 3, examples of the specific structural forms of the mounting pin 110 and the brake head 200 are also shown. Wherein, the side edge of the pin portion 112 of the mounting pin 110 may be provided with a first notch 112a and a second notch 112b arranged in a stepped shape in the extending direction thereof, wherein the size of the first notch 112a is larger than the size of the second notch 112b in the extending direction of the pin portion 112, so as to be matched with different components respectively. Specifically, the first notch 112a can be matched with the first section 121 of the first mounting hole, that is, the positioning of the limiting member 120 on the pin portion 112 is achieved; and, the second notch 112b is matched with the second section 131 of the first mounting hole, that is, the positioning of the stopper 130 on the pin portion 112 is achieved. This arrangement plays a great role in the precise positioning of these components on the mounting pin, so that each component can better realize its own function. For example, the positioning of the limiting member 120 on the pin portion 112 makes it possible for the limiting member 120 to accurately abut against and restrict the movement of the abrasive block in the direction away from the brake head (the positive direction of the X-axis in the figure). For another example, the positioning of the stopper 130 can avoid unnecessary interference or friction with the limiting member 120 on the pin portion 112, thereby improving the assembly of components and increasing the service life of the components.

In addition, the mounting pin locking member may be a positioning pin; and, the mounting pin receiving portion or the stopper 130 used as a part of the mounting pin receiving portion may be provided with a first positioning hole 132 communicated with the first mounting hole or the second section 131 of the first mounting hole; and at the same time, the pin portion 112 is provided with a second positioning hole 112c. Wherein, the extending direction of the first positioning hole 132 and the second positioning hole 112c should be arranged crosswise to the extending direction of the pin portion 112. When the mounting is completed, the mounting pin receiving portion or the stopper 130 used as a part of the mounting pin receiving portion can be locked with the pin portion 112 by inserting the positioning pin through the first positioning hole 132 and the second positioning hole 112c. In this way, a simple mounting and dismounting process and high reliability of the mounting and dismounting assembly are better achieved.

More specifically, the second positioning hole 112c mentioned in the foregoing embodiment may be in the form of a closed hole not shown in the drawings or may be a notch shown in FIG. 3 or provided along the side edge of the pin portion 112, as long as it can achieve the function of matching and locking with the positioning pin.

In another aspect, the positioning pin may be a cotter pin 140 with a bent portion 141 at least at one end. After the cotter pin 140 is inserted through the first positioning hole 132 and the second positioning hole 112c, the bent portion 141 is bent (for example, bent to 90°) to restrict the movement of the cotter pin 140 in the insertion direction, thereby providing a structure form that can be easily mounted and dismounted and with reliable positioning. Of course, the positioning pin can also be provided with the aforementioned bent portions at both ends or be provided with a base at the other end, as long as the positioning pin can be locked and easily mounted and dismounted.

Figure 2:
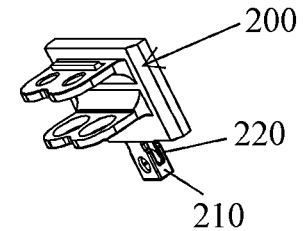
FIG. 2 is a schematic diagram of an embodiment of a brake head of an abrasive block mounting and dismounting assembly of the present application.

In addition, an embodiment of a wheel tread cleaner is further provided herein in conjunction with FIG. 1 to FIG. 2. The figures show the various components comprised in the wheel tread cleaner, such as a brake head 200, an abrasive block 300, and an abrasive block mounting and dismounting assembly 100. Wherein, the aforementioned abrasive block mounting and dismounting assembly 100 may be the abrasive block mounting and dismounting assembly in any of the foregoing embodiments or a combination thereof. In the wheel tread cleaner, the brake head 200 has an extending and protruding mounting joint 210 having a mounting cavity 220. For example, the illustrated mounting joint 210 may be a rectangular cavity-like structure with rectangular grooves on both sides and the top, and the rectangular grooves on both sides form the mounting cavity 220 described herein. The abrasive block 300 moves from the side of the brake head 200 with the mounting joint 210 along the negative direction of the X-axis to be sleeved on the brake head 200, with the mounting cavity 220 exposed. Then, the mounting pin 110 is inserted by the abrasive block mounting and dismounting assembly 100 from the right side of the mounting cavity 220 until it passes through the left side of the mounting cavity 220 and is received into the first mounting hole by the mounting pin receiving portion disposed on the left side of the mounting cavity 220. Thereafter, the mounting pin 110 and the mounting pin receiving portion are detachably locked by the mounting pin locking member, so as to restrict the movement of the abrasive block 300 in the direction away from the brake head 200 (the positive direction of the X-axis in the figure).

Under such an arrangement, the aforementioned embodiment of the present application provides a wheel tread cleaner having an abrasive block mounting and dismounting assembly for efficiently mounting and dismounting abrasive blocks on the brake head, which can efficiently dismount and replace the abrasive blocks when they are worn out, thereby ensuring that the wheel tread cleaner of the rail transit vehicle with abrasive blocks in normal state can operate safely and reliably, and the problem of wheel-rail adhesion can be effectively improved.

In addition, as a specific implementation form to restrict the movement of the abrasive block 300 in the direction away from the brake head 200 (the positive direction of the X-axis in the figure), the base portion 111 of the mounting pin 110 and the mounting pin receiving portion of the abrasive block mounting and dismounting assembly 100 can also be configured to abut against the abrasive block 300. As shown in FIG. 1, under this arrangement, the base portion 111 and the limiting member 120 of the mounting pin receiving portion of the abrasive block mounting and dismounting assembly 100 respectively abut, on a large area, against two protrusions on an abrasive block back plate on the abrasive block 300, so as to increase the effective contact area of the two, thereby effectively preventing the wear of the abrasive block mounting and dismounting assembly of the wheel tread cleaner caused by abnormal impacts to the components due to harmful vibrations of vehicles, and also eliminating the risks of falling off components and abrasive blocks, etc.

Furthermore, for the wheel tread cleaner, it may also comprise a split-type abrasive block designed and provided according to the present application. The embodiment of a split-type abrasive block will be exemplarily discussed below in conjunction with FIG. 6 and FIG. 7, so as to explain its characteristics and advantage obviously superior to these of the prior art. In practical application, the split-type abrasive block can be detachably or fixedly mounted on the brake head, so that it can be used as a part of the entire wheel tread cleaner for operations such as cleaning the wheel tread and improving adhesion, etc.

Figure 6:
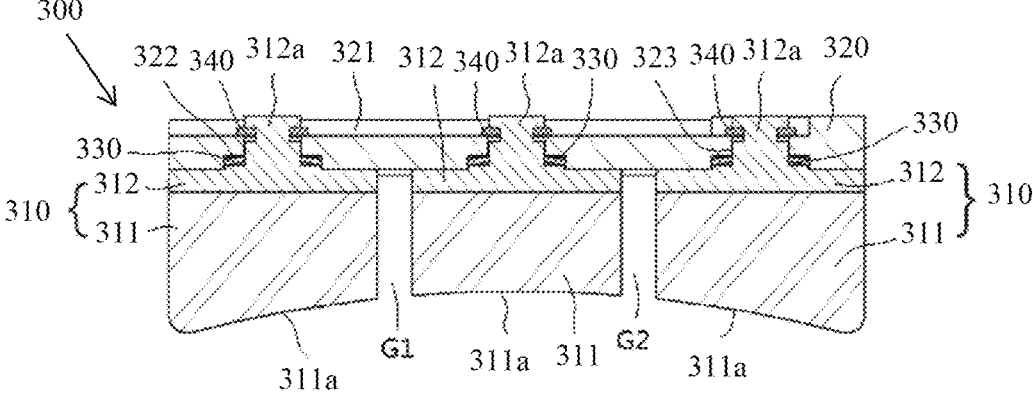
FIG. 6 is a schematic cross-sectional structural diagram of an embodiment of a split-type abrasive block of the present application.
Figure 7:
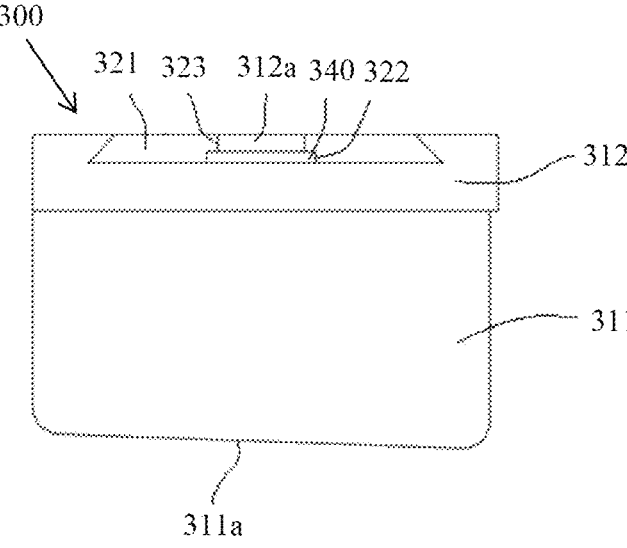
FIG. 7 is a side view of the embodiment of the split-type abrasive block shown in FIG. 6.

For example, FIG. 6 only schematically shows a general structural configuration of an embodiment of a split-type abrasive block according to the present application. And FIG. 7 shows a side view structure of the embodiment of the split-type abrasive block.

As shown in FIG. 6, three abrasive block assemblies 310 and a connecting piece 320 are provided in the split-type abrasive block 300. These components form the overall structure of the split-type abrasive block 300. Specifically, the connecting piece 320 is detachably mounted on the brake head of the railway vehicle, for example, it is mounted on the brake head through any suitable concave-convex structure 321 (e.g., a groove such as a dovetail groove, a bump or a combination structure thereof). As such, the mounting hook, a connecting structure commonly used in the previous abrasive block products can be replaced, so that with the help of the concave-convex structure 321 such as the dovetail groove exemplarily shown in FIG. 7, the overall structure of the system can be made to be more stable, and the mounting, maintenance, replacement and other operations of the abrasive block can be faster and more convenient.

For the aforementioned abrasive block assembly 310, it may comprise a friction 311 and a support piece 312. Wherein, the support piece 312 is configured to provide support, connection and other functions to the friction 311, while the friction 311 can be connected to a connecting piece 320 through the support piece 312. For example, as shown in FIG. 6 and FIG. 7, by way of example, the support piece 312 may be configured to have a cylindrical boss 312a, so that the cylindrical boss 312a can pass through the mounting hole 323 on the connecting piece 320 and be fixed onto the connecting piece 320 using mounting components such as a gasket 340 (e.g., a C-shaped gasket, a square gasket, etc.). Such a connecting structure is not only simple, stable, easy to operate, but also safe and reliable. Besides, when the connecting structure is used in combination with the aforementioned concave-convex structure 321, the adverse effects caused by frictional vibrations, impacts and noise can be significantly reduced.

The support piece 312 is also often referred to as "steel backing", "back plate", etc. in the industry. However, it should be understood that the support piece 312 in the present application may be made of any suitable materials comprising, for example, steel, iron, alloy materials, and the like, and the actual shape configuration of the support piece 312 is not limited to the plate shape but is allowed to have any possible suitable shape configurations, so as to better meet various application requirements. In addition, for the different abrasive block assemblies 310, their respective support pieces 312 may be made of the same or different materials and may have the same or different shape configurations. For example, the support pieces 312 in the three abrasive block assemblies 310 shown in FIG. 6 can be configured to have the same shapes, so as to improve the universality of the components and reduce the manufacture, use and maintenance costs of the products.

Generally speaking, the abrasive block assembly 310 can be formed by combining both the friction 311 and the support piece 312 in a number of possible connection manners. For example, optionally, the friction 311 and the support piece 312 can be integrally hot-pressed, and then sintered and cured to form as one piece, so that the overall strength of the abrasive block assembly 310 can be fully guaranteed, and the undesired situation in which the friction 311 is separated from the support piece 312 due to some special circumstances that may possibly occur during use can be avoided. For another example, the friction 311 and the support piece 312 may be fixed together using connecting components such as bolts, nuts and the like alone or in combination, or it may be considered to connect them together using an adhesive and the like alone or in combination.

With continued reference to FIG. 6, in this embodiment, the respective friction 311 in the three abrasive block assemblies 310 are arranged so that their respective surfaces 311a face the outside, so as to be in frictional contact with the wheel tread of the railway vehicle during use. For example, optionally, the surfaces 311a of the friction 311 in the abrasive block assemblies 310 can be arranged such that the overall surface formed by the surfaces 311a is of the shape of a circular arc as shown in FIG. 6. Of course, such overall surface can also be configured to be of any possible suitable shapes, such as a wave shape, with local planes contained therein, etc., so as to be fully applicable to various possible application scenarios.

As shown in FIG. 6, in the split-type abrasive block 300, the three abrasive block assemblies 310 are spaced apart from each other, so that two gaps, i.e., gap G1 and gap G2, are respectively formed therebetween. Since the present application innovatively provides such gap structures between the friction 311, not only the contact area between these friction 311 and the wheel tread can be effectively reduced, but also timely evacuating the heat, abrasive debris, etc. from the channels provided by these gaps can be promoted, thereby significantly reducing the temperature generated at the friction surface of the abrasive block under the same working conditions, and effectively avoiding metal inlays of the abrasive block and thus reducing the possibility of the metal inlays scratching the wheel.

It should be noted that, in a specific application scenario, the aforementioned gap layout between the friction 311 can be flexibly configured according to actual requirements. For example, although the two gaps G1 and G2 located between different friction 311 are set to have the same width as each other in the embodiment shown in FIG. 6, in some embodiments, however, the widths of these gaps can be configured to be different or completely the same as each other, that is, the widths of the respective gaps in the split-type abrasive block are allowed to be the same or different. In addition, in some embodiments, only one gap may be provided in the split-type abrasive block, instead of requiring that a gap must be arranged between two adjacent abrasive block assemblies 310, that is, in some cases, some adjacent abrasive block assemblies 310 in the split-type abrasive block are allowed to be arranged closely to each other without a gap arranged therebetween.

It should be noted that, in the split-type abrasive block according to the present application, the friction 311 of the respective abrasive block assemblies 310 may be made of the same material, or of different materials. Likewise, the support pieces 312 of the respective abrasive block assemblies 310 are also allowed to be made of the same or different materials. In addition, for the friction 311, it can adopt a shape-trimming friction piece, an adhesion-improving friction piece or a combination thereof. For example, for the respective friction 311 located at different positions, it can be considered, according to the actual condition of the friction pieces' frictional contact with the wheel tread, that the friction 311 of one or more abrasive block assemblies 310 in the split-type abrasive block adopt shape-trimming friction pieces, while the friction 311 of other one or more abrasive block assemblies 310 adopt adhesion-improving friction pieces or adopt shape-trimming friction pieces and adhesion-improving friction pieces at the same time. In this way, the split-type abrasive block has better overall performance, and is more flexible in use, fully adapted to different application scenarios.

In addition, in the split-type abrasive block 300 shown in FIG. 6, three elastic members 3330 are disposed between the support pieces 312 and the connecting piece 320 of the three abrasive block assemblies 310. Such elastic members 3330 can adopt any components that can provide elastic deformation functions, such as disc springs, coil springs, etc., and they can be accommodated in the hole grooves 322 formed on the connecting piece 320. For example, in the embodiment shown in FIG. 6, the aforementioned hole grooves 322 adopt a counterbore structure, and disc springs are then installed in these hole grooves 322 as the elastic members 3330.

By adopting the above structural configuration, when the split-type abrasive block is used, the surfaces 311a of the friction 311 will be in frictional contact with the wheel tread, so as to achieve cleaning and adhesion-improving for the wheel tread by the abrasive block. When the contour of the abrasive block and the contour of the wheel cannot be completely fitted (for example, the arc center of the overall surface of the abrasive block and the center of the wheel are not at the same height), part of one or some of the friction 311 of the abrasive block will first come into contact with the wheel. At this time, under the combined action of air pressure and the wheel tread, the friction 311 of the abrasive block together with the support pieces 312 will transfer the deflection angle to the elastic members 3330, and the latter, with elastic deformation characteristics, can make adjustments in a timely and accurate manner to make the abrasive block and the wheel tread fit to the greatest extent. At the same time, by arranging the elastic members 3330, the vibration, impact and noise of the railway vehicle in the longitudinal, lateral and vertical directions can be reduced, which can effectively increase the service life of components and ensure the overall safety and reliability of the system.

Figure 8:
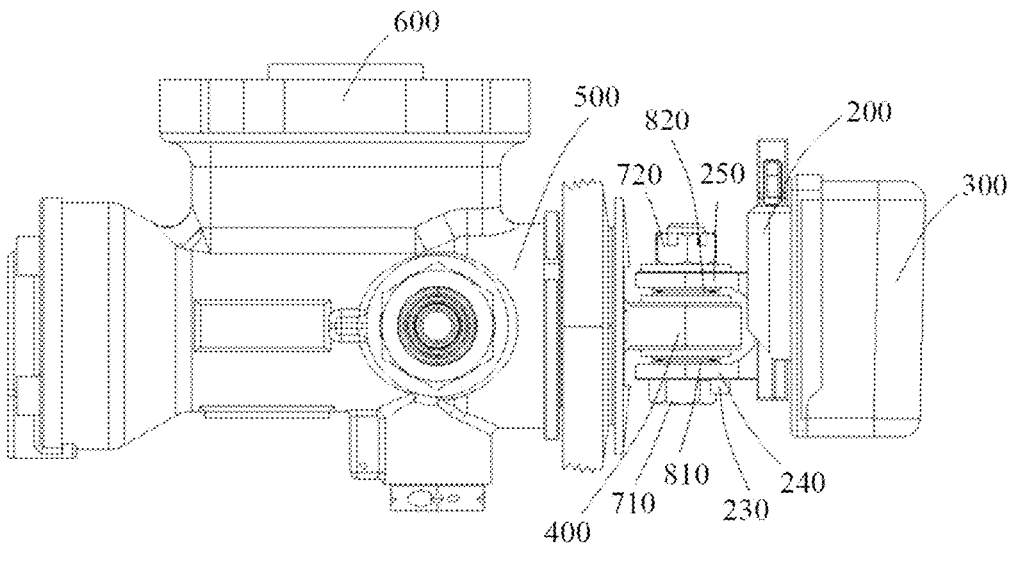
FIG. 8 is a side view of an embodiment of a tread cleaner according to the present application.
Figure 9:
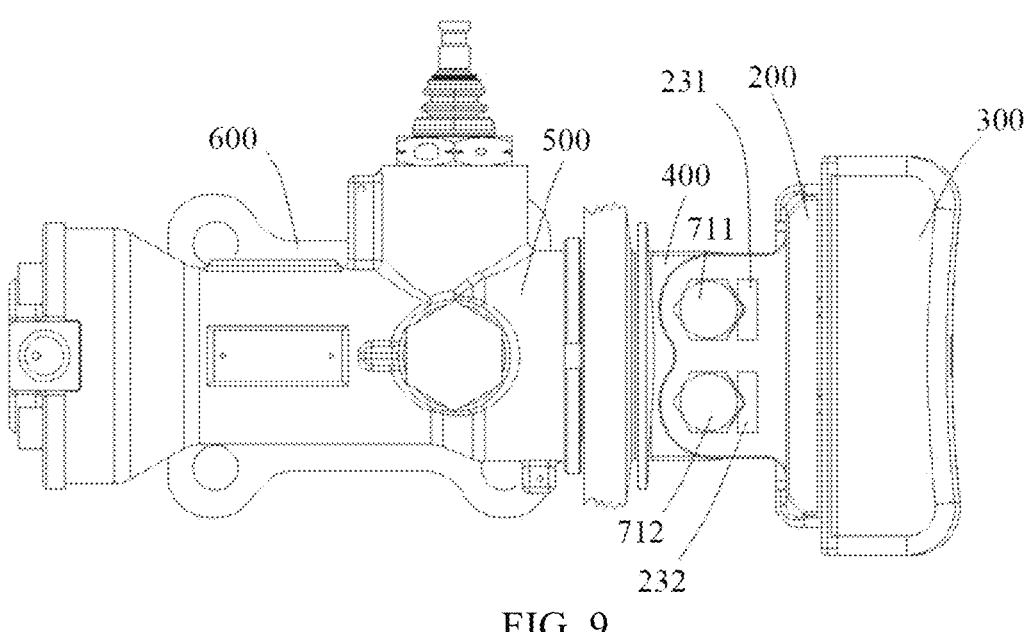
FIG. 9 is a bottom view of the tread cleaner of FIG. 8.

Another improvement of an embodiment of the wheel tread cleaner according to the present application will be introduced below with continued reference to FIG. 8 to FIG. 10. The wheel tread cleaner according to the embodiment may comprise: a mounting base 600, a cylinder member 500 comprising a piston rod 400 capable of performing linear movement; the brake head 200 may be connected to the piston rod 400 and the brake head 200 is provided with an abrasive block 300. When, for example, the railway vehicle is braking, the piston rod 400 pushes the brake head 200 to make the abrasive block 300 abut against the wheel tread, so as to act on the wheel tread for the purpose of cleaning the tread. In the embodiment, the coupling end of the piston rod 400 has two bolt holes, the coupling portion of the brake head 200 has a first clamping piece 240 and a second clamping piece 250, and the first clamping piece 240 and the second clamping piece 250 have bolt holes, the positions of which correspond to that of the bolt holes of the piston rod 400 respectively, and the first clamping piece 240 and the second clamping piece 250 are located on both sides of the coupling end of the piston rod 400. FIG. 8 shows that the first clamping piece 240 is located on the lower side of the coupling end of the piston rod 400, and the second clamping piece 250 is located on the upper side of the coupling end of the piston rod 400. As shown in FIG. 9, a first bolt and a second bolt respectively pass through the bolt holes of the first clamping piece 240, the coupling end of the piston rod 400 and the second clamping piece 250 and are received by a nut 720 on the outer side of the second clamping piece (only one nut is visible in FIG. 8). One or more limiting components 230 against which the bolt heads 710 of the first bolt and the second bolt abut are provided on the outer side of the first clamping piece 240 to restrict the rotation of the first bolt and the second bolt. The rotation of the bolts during mounting and operation is restricted by one or more limiting components 230, which provide support points for the bolts when the bolts are being mounted, thereby facilitating the mounting of the bolts and preventing the bolts from rotating and slipping during operation.

Figure 10:
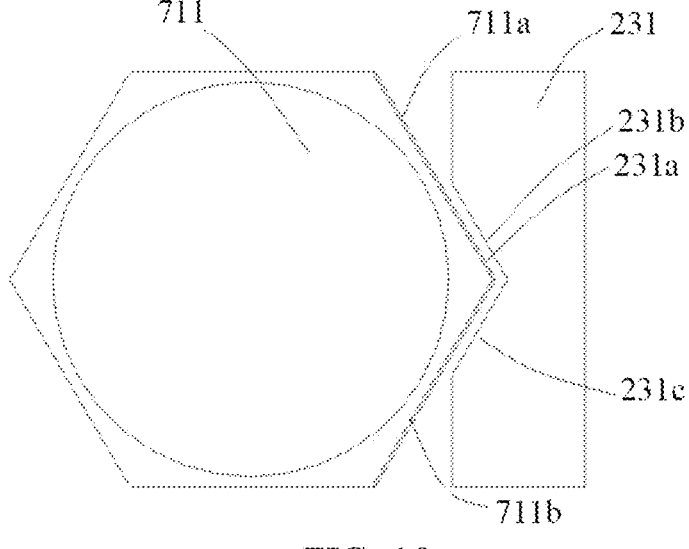
FIG. 10 is a partial enlarged view of the tread cleaner of FIG. 8.

In the embodiment shown in FIG. 8 to FIG. 10, the bolt heads 711, 712 are both outer hexagonal. In other embodiments, the bolt heads may be of other shapes. In some embodiments, the limiting component 230 is formed as a boss located on the outer side of the first clamping piece 240. In other embodiments, the limiting component 43 can also be formed as a groove recessed from the outer plane of the first clamping piece 240, wherein the bolt head of the respective bolt can be arranged in the groove and abut against the side walls of the groove. The groove may abut against one or more surfaces of the bolt head, such as two or all surfaces.

In the embodiment shown in FIG. 8 to FIG. 10, the boss comprises a first boss 231 corresponding to the first bolt and a second boss 232 corresponding to the second bolt, wherein the first boss 231 abuts against the bolt head 711 of the first bolt to prevent the first bolt from rotating, and the second boss 232 abuts against the bolt head 712 of the second bolt to prevent the second bolt from rotating. In some embodiments, the first boss 231 and the second boss 232 comprise a first corner cut and a second corner cut, respectively, wherein the first corner cut and the second corner cut abut against two adjacent surfaces of the bolt heads 711,712 of the first bolt and the second bolt, respectively. More clearly, referring to FIG. 10, the first boss 231 has a first corner cut 231a, and the first corner cut 231a comprises two sides 231b, 231c that respectively abut against two adjacent sides 711a, 711b of the bolt head 711 of the first bolt. The second boss and the bolt head of the second bolt may have the same or similar configuration. In alternative embodiments, the boss may comprise a trapezoid shape to abut against three sides of the bolt head or may comprise other shapes to abut against more sides. For example, in an embodiment, the boss may completely surround the entire bolt head.

Referring to FIG. 8, in some embodiments, a first elastic component 810 and a second elastic component 820 are respectively provided between the inner sides of the first clamping piece 240 and the second clamping piece 250 and the coupling end of the piston rod 400, and the first bolt and the second bolt also pass through the first elastic component 810 and the second elastic component 820, respectively. The elastic components allow the brake head 200 and the abrasive block 300 to move slightly in the up-down direction in FIG. 8. when mounting the bolt, since the bolt head abuts against the limiting component, only a specific torque is required to be applied to the nut end to finish the assembly. This specific torque compresses the elastic components 810,

820 to a predetermined degree. In some embodiments, the two bolt holes are arranged in a transverse direction perpendicular to the movement direction of the piston rod, and the first and the second bolts pass through the two bolt holes in the longitudinal direction. In alternative embodiments, the two bolt holes may not be arranged in a transverse direction or referred to as offsetting in the transverse direction.

Figure 11:
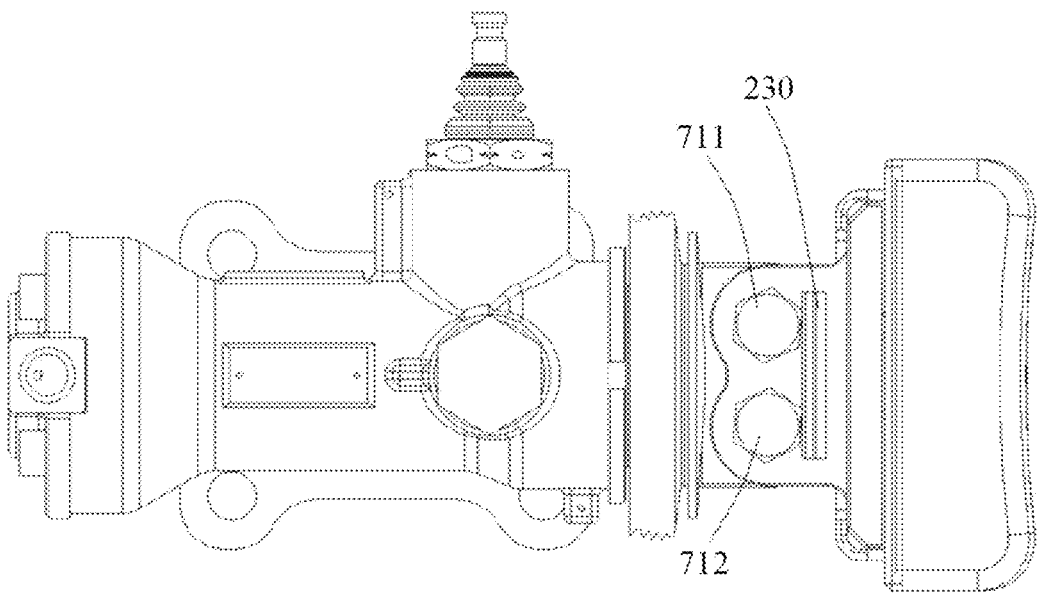
FIG. 11 is a bottom view of another embodiment of a tread cleaner according to the present application.
Figure 12:
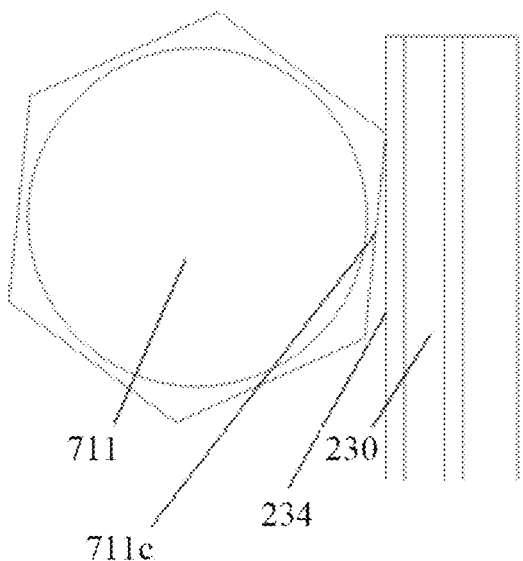
FIG. 12 is a partial enlarged view of the tread cleaner of FIG. 11.

With continued reference to FIG. 11 and FIG. 12, another embodiment of a tread cleaner is shown. In this embodiment, the boss 43 is integrally formed and has a flat end face. The flat end face of the boss 43 abuts against a surface of the bolt head of the first bolt and a surface of the bolt head of the second bolts at the same time. Specifically, as shown in FIG. 12, the flat end face 234 of the boss 43 abuts against a surface 711c of the bolt head 711, and the same flat end face 234 of the boss 43 also abuts against a surface (not shown) of the bolt head 712 with a similar structure. The structure can be manufactured more conveniently.

In an embodiment, a tread cleaner is further provided, comprising: a cylinder member comprising a piston rod capable of performing linear movement; the brake head may connect to the piston rod and the brake head is provided with an abrasive block; wherein, the coupling portion of the brake head has two bolt holes, and the coupling end of the piston rod has a first clamping piece and a second clamping piece, the first clamping piece and the second clamping piece have bolt holes, the positions of which correspond to that of the bolt holes of the brake head respectively, and the first clamping piece and the second clamping piece are located on both sides of the coupling portion of the brake head. A first bolt and a second bolt pass through the bolt holes of the first clamping piece, the coupling portion of the brake head and the second clamping piece respectively, and are received by nuts on the outer side of the second clamping piece, wherein limiting components against which the bolt heads of the first bolt and the second bolt abut are provided on the outer side of the first clamping piece to restrict the rotation of the first bolt and the second bolt. Compared with the aforementioned embodiments of FIG. 8 to FIG. 12, in this embodiment, the coupling head of the piston rod forms into two pieces and clamps the coupling portion of the brake head. It should be understood that the various modifications described according to FIG. 8 to FIG. 12 can also apply to this structure.

The wheel tread cleaner under this arrangement has a reasonable structure, is convenient to use, reduces assembly cost, and can be assembled quickly with hinged bolts of the tread cleaner. In addition, it also effectively prevents the bolts from slipping and rotating in the bolt holes when the tread cleaner is working.

In addition, although not shown in the drawings, the present application also provides a railway vehicle, on which any embodiments or a combination of the embodiments of the aforementioned abrasive block mounting and dismounting assembly can be arranged, or any embodiments or a combination of the embodiments of the aforementioned wheel tread cleaner can be arranged, according to application requirements. Therefore, it can also have the technical effects brought about by the aforementioned technical solutions. It should be noted that the aforementioned railway vehicles may comprise, but are not limited to, subway locomotives, high-speed rail locomotives, bullet trains, urban light-rail trains and other types of vehicles.

It should be noted that the abrasive block mounting and dismounting assembly, the wheel tread cleaner and other parts of the railway vehicle provided according to the present application can be designed, manufactured and sold separately, or they can be assembled together and then sol d as a whole. Regardless of the monomers formed before the combination or the whole formed after the combination, they all fall within the protection scope of the present application.

Furthermore, according to yet another aspect of the present application, a method for mounting and dismounting an abrasive block 300 and a brake head 200 is further provided, wherein the brake head 200 to which the method is applied should have an extending and protruding mounting joint 210, and the mounting joint 210 should have a mounting cavity 220. Specifically, the mounting and dismounting method may comprise two parts: mounting steps and dismounting steps. Wherein, the mounting steps comprise: sleeving the abrasive block 300 on the brake head 200 of the wheel tread cleaner from the side of the brake head 200 with the mounting joint 210, with the mounting cavity 220 exposed; inserting the pin portion 112 of the mounting pin 110 of the abrasive block mounting and dismounting assembly 100 from a first side through into a second side of the mounting cavity 220 of the brake head 200, until the base portion 111 of the mounting pin 110 abuts against the first side of the mounting cavity 220; receiving, using the first mounting hole of the mounting pin receiving portion, the pin portion 112 protruding from the second side of the mounting cavity 220, for example, receiving the pin portion 112 via the first section 121 of the limiting member 120 and the second section 131 of the stopper 130 in sequence; and then locking, using the mounting pin locking member (e.g., a bent portion 141 of a cotter pin 140), the pin portion 112 of the mounting pin 110 with the mounting pin receiving portion (e.g., comprising the limiting member 120 and the stopper 130).

In addition, the dismounting steps comprise: unlocking the mounting pin locking member of the abrasive block mounting and dismounting assembly 100 (e.g., by straightening or removing the bent portion 141 of the cotter pin 140), and removing it from the pin portion 112 of the mounting pin 110 and the mounting pin receiving portion (e.g., comprising the limiting member 120 and the stopper 130); subsequently, removing the pin portion 112 until it leaves the first mounting hole of the mounting pin receiving portion, for example, leaves through the second section 131 of the stopper 130 and the first section 121 of the limiting member 120, and then leaves the mounting cavity 220 of the brake head 200; finally, removing the abrasive block 300 sleeved on the brake head 200 from the side of the brake head 200 with the mounting joint 210.

Under such an arrangement, the mounting and dismounting method provided by the foregoing embodiment of the present application can realize efficient mounting and dismounting of the abrasive block mounting and dismounting assembly, so that the abrasive blocks can be efficiently dismounted and replaced after they have been worn out, thereby ensuring safe and reliable operation of the wheel tread cleaner of the rail transit vehicle with abrasive blocks in normal state, and effectively improving the problem of wheel-rail adhesion.

The abrasive block mounting and dismounting assembly, the mounting and dismounting method, the wheel tread cleaner and the railway vehicle according to the present application are described in detail above by way of example. These examples are only used to illustrate the principles and implementations of the present application, rather than limiting the application. Those skilled in the art can also make various modifications and improvements without departing from the spirit and scope of the present application. For example, although three abrasive block assemblies are arranged in the split-type abrasive block at the same time as an example in the above embodiments, in practical application scenarios, however, it is possible to flexibly increase or decrease the number of abrasive block assemblies in the split-type abrasive block according to the requirements, for example, two, four or more abrasive block assemblies can be arranged at the same time. Therefore, all equivalent technical solutions should belong to the scope of the present application and be defined by the claims of the present application.

What is claimed is:

1. A abrasive block mounting and dismounting assembly, comprising:

a mounting pin comprising a base portion and a pin portion extending and protruding from an end of the base portion, the size of the pin portion in the extending direction thereof being smaller than the size of the base portion; wherein the pin portion is used to pass from a first side to a second side of a mounting cavity of a brake head, and the end of the base portion is configured to directly contact the first side of the mounting cavity of the brake head and be used to abut against the first side of the mounting cavity of the brake head;

a mounting pin receiving portion having a first mounting hole for receiving the pin portion to be inserted therein; and the mounting pin receiving portion is used to receive the pin portion on the second side of the mounting cavity of the brake head; and a mounting pin locking member for detachably locking the pin portion of the mounting pin with the mounting pin receiving portion, and restricting movement of the pin portion in the extending direction thereof.

2. The abrasive block mounting and dismounting assembly according to claim 1, wherein the mounting pin receiving portion comprises:

a limiting member for restricting an abrasive block mounted on a brake head from moving in a direction away from the brake head; and a stopper;

wherein the first mounting hole has a first section extending through the limiting member and a second section extending at least partially into the stopper; and the mounting pin locking member detachably locks the pin portion of the mounting pin with the stopper, and restricts movement of the pin portion and the limiting member in the extending direction thereof.

3. The abrasive block mounting and dismounting assembly according to claim 2, wherein a side edge of the pin portion is provided with a first notch and a second notch arranged in a stepped shape in the extending direction thereof, the size of the first notch being larger than the size of the second notch in the extending direction of the pin portion; wherein, the first notch is matched with the first section of the first mounting hole, and the second notch is matched with the second section of the first mounting hole.

4. The abrasive block mounting and dismounting assembly according to claim 1, wherein the mounting pin locking member comprises a positioning pin, and the mounting pin receiving portion is provided with a first positioning hole in communication with the first mounting hole; the pin portion is provided with a second positioning hole; wherein, the extending direction of the first positioning hole and the second positioning hole is arranged crosswise to the extending direction of the pin portion; the positioning pin is inserted through the first positioning hole and the second positioning hole to lock the mounting pin receiving portion and the pin portion.

5. A wheel tread cleaner, comprising: a brake head, an abrasive block, and the abrasive block mounting and dismounting assembly according to claim 1;

wherein, the brake head has an extending and protruding mounting joint having a mounting cavity; the abrasive block is sleeved on the brake head from a side of the brake head with the mounting joint, with the mounting cavity exposed; and the abrasive block mounting and dismounting assembly restricts movement of the abrasive block in a direction away from the brake head via the mounting pin mounted on both sides of the mounting cavity and the mounting pin receiving portion, and detachably locks the pin portion of the mounting pin with the mounting pin receiving portion via the mounting pin locking member.

6. The wheel tread cleaner according to claim 5, wherein the base portion of the mounting pin and the mounting pin receiving portion of the abrasive block mounting and dismounting assembly are configured to abut against the abrasive block and restrict the abrasive block from moving in a direction away from the brake head.

7. The wheel tread cleaner according to claim 5, wherein the abrasive block is a split-type abrasive block, comprising:

a connecting piece detachably mounted on a brake head of a railway vehicle; and at least two abrasive block assemblies, wherein each abrasive block assembly has a friction piece and a support piece, the friction piece is configured to provide a surface for frictional contact with a wheel tread of a railway vehicle and is connected with the connecting piece through the support piece, and a gap is provided between at least two of the abrasive block assemblies.

8. The wheel tread cleaner according to claim 7, wherein an elastic member is provided between the support piece of at least one of the abrasive block assemblies and the connecting piece.

9. The wheel tread cleaner according to claim 7, wherein the split-type abrasive block comprises three abrasive block assemblies that are arranged so that widths of the gaps between two adjacent abrasive block assemblies are equal, and an overall surface formed by the surfaces of the friction pieces in the respective abrasive block assemblies is in the shape of a circular arc.

10. The wheel tread cleaner according to claim 5, further comprising:

a cylinder member comprising a piston rod capable of performing linear movement;

wherein the brake head is connected to the piston rod and the brake head is provided with the abrasive block; a coupling end of the piston rod has two bolt holes, a coupling portion of the brake head has a first clamping piece and a second clamping piece, the first clamping piece and the second clamping piece respectively have bolt holes, the positions of which correspond to that of the bolt holes of the piston rod, and the first clamping piece and the second clamping piece are located on both sides of the coupling end of the piston rod; a first bolt and a second bolt respectively pass through the bolt holes of the first clamping piece, the coupling end of the piston rod and the second clamping piece, and are received by nuts on the outer side of the second clamping piece, wherein one or more limiting components against which bolt heads of the first bolt and the second bolt abut are provided on the outer side of the first clamping piece to restrict rotation of the first bolt and the second bolt.

11. The wheel tread cleaner according to claim 10, wherein the bolt head is outer hexagonal, and the limiting component abuts against one or two surfaces of the bolt head.

12. The wheel tread cleaner according to claim 10, wherein the limiting component is formed as a boss located on the outer side of the first clamping piece.

13. The wheel tread cleaner according to claim 12, wherein the boss has a flat end face that abuts against one surface of the bolt heads of the first bolt and the second bolt at the same time.

14. The wheel tread cleaner according to claim 12, wherein the boss comprises a first boss corresponding to the first bolt and a second boss corresponding to the second bolt.

15. The wheel tread cleaner according to claim 10, wherein the limiting component is formed as a groove recessed from the outer side of the first clamping piece, and the bolt heads of the first bolt and the second bolt are arranged in the groove and abut against side walls of the groove.

16. The wheel tread cleaner according to claim 10, wherein a first elastic component and a second elastic component are respectively provided between the inner sides of the first clamping piece and the second clamping piece and the coupling end of the piston rod, and the first bolt and the second bolt also pass through the first elastic component and the second elastic component, respectively.

17. The wheel tread cleaner according to claim 10, wherein the two bolt holes are arranged in a transverse direction perpendicular to the moving direction of the piston rod, and the first bolt and the second bolt pass through the two bolt holes in a longitudinal direction.

18. The wheel tread cleaner according to claim 5, comprising:

a cylinder member comprising a piston rod capable of performing linear movement;

wherein the brake head is connected to the piston rod and the brake head is provided with an abrasive block; a coupling portion of the brake head has two bolt holes, a coupling end of the piston rod has a first clamping piece and a second clamping piece that respectively have bolt holes, the positions of which correspond to that of the bolt holes of the brake head, and the first clamping piece and the second clamping piece are located on both sides of the coupling portion of the brake head; a first bolt and a second bolt respectively pass through the bolt holes of the first clamping piece, the coupling portion of the brake head and the second clamping piece, and are received by nuts on the outer side of the second clamping piece, wherein a limiting component against which the bolt heads of the first bolt and the second bolt abut are provided on the outer side of the first clamping piece to restrict rotation of the first bolt and the second bolt.

19. A railway vehicle, comprising: the wheel tread cleaner according to claim 5.

20. The railway vehicle according to claim 19, the wheel tread cleaner comprising: a brake head, an abrasive block, and the abrasive block mounting and dismounting assembly;

wherein, the brake head has an extending and protruding mounting joint having a mounting cavity; the abrasive block is sleeved on the brake head from a side of the brake head with the mounting joint, with the mounting cavity exposed; and the abrasive block mounting and dismounting assembly restricts movement of the abrasive block in a direction away from the brake head via the mounting pin mounted on both sides of the mounting cavity and the mounting pin receiving portion, and detachably locks the pin portion of the mounting pin with the mounting pin receiving portion via the mounting pin locking member.

* * * * *